| United States Patent [19] | [11] Patent Number: 4,957,952 |
|---|---|
| Sekmakas et al. | [45] Date of Patent: Sep. 18, 1990 |

[54] ANIONIC ELECTROCOAT COMPOSITIONS CONTAINING EPOXY PHOSPHATES

[75] Inventors: Kazys Sekmakas, St. Petersburg Beach, Fla.; Aurelio Parenti, Norridge, Ill.

[73] Assignee: DeSoto, Inc., Des Plaines, Ill.

[21] Appl. No.: 485,773

[22] Filed: Feb. 21, 1990

Related U.S. Application Data

[63] Continuation of Ser. No. 847,535, Apr. 3, 1986, abandoned.

[51] Int. Cl.$^5$ .................. C08G 59/14; C08L 63/00
[52] U.S. Cl. .................................. 523/402; 523/402; 523/412
[58] Field of Search .................. 523/402, 409, 412

[56] References Cited

U.S. PATENT DOCUMENTS

| 4,397,970 | 8/1983 | Campbell | 523/402 |
|---|---|---|---|
| 4,425,451 | 1/1984 | Sekmakas | 523/402 |
| 4,461,857 | 7/1984 | Sekmakas | 523/417 |
| 4,598,109 | 7/1986 | Sekmakas | 523/402 |

*Primary Examiner*—Paul R. Michl
*Assistant Examiner*—Patrick A. Doody
*Attorney, Agent, or Firm*—Dressler, Goldsmith, Shore, Sutker & Milnamow, Ltd.

[57] ABSTRACT

Thermosetting aqueous anionic electrocoating composition are disclosed which comprise a carboxyl-functional anionic polymer dispersed in water with the aid of water miscible organic solvent and a volatile base, and from about 1% to about 5%, based on the weight of the polymer content of the composition, of an oxirane-free epoxy phosphate, this epoxy phosphate being produced by slowly and incrementally adding a resinous polyepoxide to a solvent solution containing from 0.05 to 0.9 mole of orthophosphoric acid per oxirane equivalent in the polyepoxide together with sufficient water to hydrolyze all of the oxirane functionality which is not consumed by the orthophosphoric acid. These epoxy phosphates improve the corrosion resistance of electrodeposited cured coatings without objectionably wrinkling their surface.

9 Claims, No Drawings

ANIONIC ELECTROCOAT COMPOSITIONS CONTAINING EPOXY PHOSPHATES

This application is a continuation of application Ser. No. 06/847,535, filed Apr. 3, 1986 now abandoned.

DESCRIPTION

1. Technical Field

This invention relates to anionic electrocoat compositions adapted to deposit coatings exhibiting improved corrosion resistance.

2. Background of the Invention

Carboxyl-functional polymers, and especially carboxyl-functional acrylic copolymers, can be dispersed in water with the aid of a volatile base, such as ammonia or a volatile amine, which forms a salt with the carboxyl groups in the polymer. These aqueous dispersions at appropriate low solids content for electrocoating (from 3% to 20%, more preferably from 5% to 15%) are electrodeposited at the anode of a unidirectional electrical system. A curing agent, typically a phenoplast or an aminoplast resin, is incorporated into the aqueous composition and electrodeposited together with the carboxyl polymer. When the deposited coatings are baked, highly useful cured coatings are obtained. However, the corrosion resistance of these known aqueous anionic electrocoat compositions is less than desired, and it is the intention of this invention to improve this corrosion resistance, especially as indicated by salt spray testing.

DISCLOSURE OF INVENTION

In accordance with this invention, the known aqueous anionic thermosetting electrocoating compositions which comprise a carboxyl-functional polymer containing hydroxy groups for cure and which is dispersed in water with the aid of a water miscible organic solvent and a volatile base are modified for improved corrosion resistance by the inclusion in the composition of from about 1% to about 5%, preferably from 2% to 4%, of certain oxirane-free epoxy phosphates. When these modified cationic coatings compositions are electrodeposited at the anode and cured by baking at appropriate temperature, it is found that the corrosion resistance of the cured coatings is enhanced without excessively disturbing the smoothness of the coating obtained in the absence of the added epoxy phosphate. Gloss is reduced somewhat in this invention, but gloss is a matter of preference. The more epoxy phosphate used herein, the lower the gloss, so epoxy phosphate content can be used in this invention for gloss control. On the other hand, even 1% of the previously used epoxy phosphates, or more than 5% of the epoxy phosphates used herein, produce wrinkles in the surface of the cured coatings, and such surface nonuniformity is unacceptable.

The carboxyl-functional polymer can be self-curing, as by the presence of N-methylol groups therein. When the polymer is not self-curing, a curing agent therefor is incorporated into the composition.

Aqueous coating systems in which carboxy-functional copolymers containing hydroxy groups are dispersed in water with the aid of water miscible organic solvent and a volatile amine and cured by the presence of a water soluble or water dispersible aminoplast or phenoplast curing agent are well known. Efforts have previously been made, as described in Kazys Sekmakas and Raj Shah U.S. Pat. No. 4,461,857 which is commonly owned with this application, to improve the corrosion resistance properties of the coatings by the incorporation of epoxy phosphates in electrodeposited coatings. Unfortunately, the epoxy phosphates described in U.S. Pat. No. 4,461,857 unacceptably degrade the surface smoothness of the cured anodic electrodeposited coatings before they are used in a large enough proportion to provide an useful improvement in corrosion resistance, so they are not practicably used in such coatings. The epoxy phosphates which are used in this invention are not the same as those used in U.S. Pat. No. 4,461,857.

The oxirane-free epoxy phosphates used herein are provided by reacting a resinous polyepoxide with from 0.05 to 0.9 mole, preferably from 0.1 to 0.7 mole, and most preferably from 0.2 to 0.5 mole of orthophosphoric acid per equivalent of oxirane in the polyepoxide using a process in which a water miscible organic solvent in admixture with orthophosphoric acid (which contains a limited amount of water) is heated to reaction temperature together with an amount of water sufficient to hydrolyze that portion of the oxirane functionality in the polyepoxide which does not react with the phosphoric acid. The resinous polyepoxide is then slowly and incrementally added to the heated mixture so that reaction with phosphoric acid and hydrolysis of the oxirane groups will consume the added epoxy functionality quickly and thus minimize this functionality in the reaction mixture as the reaction proceeds. This minimizes epoxy-epoxy reactions which increase the molecular weight of the product and impair the capacity of the epoxy phosphate which is produced to be used in the anodic electrocoat compositions under consideration.

The proportion of water can be increased above the minimum specified above and may exceed the equivalents of polyepoxide, as illustrated in Example 1 hereinafter. The amount of water is preferably sufficient to consume at least about 50% and more preferably at least about 75% of the oxirane functionality in the epoxy resin reactant.

The temperature of reaction for the production of the hydrolyzed epoxy phosphates can vary from about 80° C. to about 130° C. Under these moderate conditions, the reaction is limited to essentially only one of the three OH groups in the orthophosphoric acid. It is preferred to use a relatively high boiling solvent, like 2-butoxy ethanol, and to use reaction temperatures near the boiling point of water, e.g., 90° C. to 105° C.

While any water miscible organic solvent can be used, like acetone, butanol, isopropanol, and the like, the ether alcohols illustrated by the preferred 2-butoxy ethanol, are preferred. In the presence of the phosphoric acid, no catalyst is needed and the desired epoxy-consuming reactions proceed without it. In a preferred embodiment, more than 75 percent of the organic solvent is 2-butoxyethanol.

The presence of the phosphoric acid provides acidity which can be measured. This acidity remains in the films which are electrodeposited and may help to disperse the epoxy phosphate solutions which are produced herein in the aqueous electrocoating baths which they are added to. Also, the phosphoric acid groups catalyze the cure, especially when an aminoplast resin is the curing agent. The amount of phosphoric acid used is adjusted to provide the desired water dispersibility and cure enhancement, and these factors will vary with the polyepoxide selected, the proportion of solvent and the cure which is desired.

While orthophosphoric acid is usually used, pyrophosphoric acid is considered an equivalent because it generates orthophosphoric acid.

Any organic solvent-soluble resinous polyepoxide may be used herein. By a polyepoxide is meant an epoxide having a 1,2-epoxy equivalency of at least about 1.2. Diepoxides are preferred, especially diglycidyl ethers of bisphenols having a 1,2-epoxy equivalency in the range of 1.3–2.0. The class of bisphenols is well known, and bisphenol A is usually used in commerce. Diglycidyl ethers of bisphenol A are commonly available in commerce and such commercial materials may be used herein. These may have a molecular weight of from about 350 to about 8,000. It is preferred to employ those polyepoxides having a 1,2-epoxy equivalency of from 1.7–2.0 and an average molecular weight (by calculation) of from about 500 up to about 5000. A molecular weight of from about 600 to about 3,000 is particularly preferred. Epon 1004 from Shell Chemical Company, Houston, TX, is useful herein. Epon 1001 (also available from Shell) further illustrates suitable polyepoxides, and is preferred.

The term "a bisphenol" is known to describe compounds of the formula:

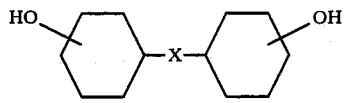

in which X is a straight chain or branched chain divalent aliphatic radical of from 1 to 3 carbon atoms, of $>SO_2$, $>SO$, or $-O-$.

The preferred bisphenol is bisphenol A (4,4'-isopropylidenediphenol) in which X is 2,2-propylidene and the two hydroxyl groups are in the para position. Other suitable bisphenols include 4,4'-thiodiphenol and 4,4'-sulfonyldiphenol.

A preferred embodiment of the invention will be described using a preferred diglycidyl ether of bisphenol A having a number average molecular weight of about 1000.

As previously noted, the reaction with the stoichiometric deficiency of orthophosphoric acid leaves some of the epoxy groups unreacted. These unreacted epoxy groups are preferably hydrolyzed with water present in the reaction mixture when the polyepoxide is added thereto. However, there is usually some alcohol present in the reaction mixture, so some esterification with alcohol may take place. These unreacted epoxy groups lead to instability in the aqueous dispersions which are formed, so any significant proportion thereof cannot be tolerated.

In conventional electrocoating practice, grounded conductive objects are immersed in the electrocoating bath and a unidirectional electrical current is passed through the bath and through the grounded object as anode to cause the carboxyl polymers, curing agent and any pigment dispersed in the bath to be electrodeposited upon the anode.

The voltages used for electrodeposition, the washing procedures employed to rinse off the bath material which remains on the electrocoated object (which is usually ferrous metal) and the baking conditions generally applicable to the various carboxyl polymer systems in use, are all known in the art and are illustrated in the example of preferred practice herein.

The copolymers used herein are solvent soluble copolymers of monoethylenically unsaturated monomers including carboxyl-functional monomer providing carboxyl groups which enable dispersion in water and hydroxy functional material providing hydroxy functionality for cure. The bulk of the polymer is provided by nonreactive monomers like styrene, vinyl toluene, methyl methacrylate, and the like. Copolymerization in organic solvent solution is preferred to provide copolymers having an hydroxyl value in the range of 30 to 300, preferably from 50 to 150, and an acid number of at least about 10. Acid numbers of 12 to 60 are preferred for electrodeposition, but higher acid numbers up to about 100 may be used.

The carboxyl functional monomers are illustrated by acrylic and methacrylic acids, though the entire class of monoethylenic monomers carrying one or more carboxyl groups can be used, such as crotonic acid, monobutyl maleate and maleic or fumaric acid.

Hydroxy functionality may be introduced using monomeric or polymeric materials or by generating it after polymerization. The useful monomers are illustrated by 2-hydroxyethyl acrylate and 2-hydroxypropyl methacrylate, though other monomers carrying one or more hydroxy groups can be used, such as allyl or methallyl alcohol. It is also possible to react a portion of the carboxy functionality provided by the carboxy functional monomer with a monoepoxide to generate the hydroxy monomer after the copolymer has been formed. Suitable monoepoxides are 1,2-propylene oxide, 1,2-butylene oxide, epoxy olefins obtained by epoxidizing a $C_{12}$–$C_{16}$ olefin, and epoxy esters, such as the commercial product Cardura E.

When hydroxy functional polymeric materials are used, one may employ epoxy ethers and esters. It has been found that ethers of oleyl alcohol with a diglycidyl ether of bisphenol A having a number average molecular weight of about 1000, to consume all the epoxy functionality, provides an hydroxy functional diether which is quite useful in providing corrosion-resistant electrocoat products, but even these are benefitted somewhat by this invention, especially their resistance to detergents. Also, similar unsaturated epoxy ethers and esters can be used in place of the oleyl ethers noted above, albeit the oleyl ethers are significantly better. These epoxy derivatives are copolymerized with monoethylenic monomers, including carboxyl-functional monomers, to provide a copolymer which can be used for anodic electrocoating.

The monoethylenically unsaturated monomers are preferably copolymerized in water-miscible organic solvent solution to provide the soluble copolymers which are primarily contemplated herein, these will include "nonreactive" monomers, as previously noted, and will usually also include reactive monomers unless reactive groups are supplied by some higher molecular weight entity with which the monomers are polymerized, such as the epoxy resin derivatives noted previously. The purpose is to provide polymer containing hydroxy groups which can be used for cure, either because they are reactive under normal curing conditions with themselves or other groups in the polymer, or because they are reactive under normal curing conditions with reactive groups supplied by an extraneous curing agent such as the aminoplast and phenoplast resins which have been noted.

The term "nonreactive" as applied to a monomer denotes the absence in the monomer of functional groups, other than the single polymerizable unsaturated group, which will react under the contemplated conditions of polymerization and cure. Normally, this means that the single ethylenic group is the only potentially reactive group present. In the preferred practice of this invention, 20% to 45% of styrene and/or vinyl toluene is combined with from 25% to 50% of alkyl acrylate or methacrylate, such as n-butyl acrylate or ethyl hexyl methacrylate, enough hydroxy monomer, such as 2-hydroxyethyl acrylate, to provide reactivity for subsequent cure (usually from 2% to 20%), and a sufficient proportion of monoethylenic carboxylic acid to provide dispersibility in water with the aid of a volatile amine (usually from 5% to 20%) and the water miscible organic solvent in which the solution copolymer was prepared. Preferred acrylic copolymers are illustrated in the Examples.

Reactive monomers may provide cure in the absence of an external cross-linking agent, or they may require such external agent for cure. Monomers which enable cure in the absence of an external agent are illustrated by isobutoxymethyl acrylamide or isobutoxymethyl methacrylamide. These may be replaced by other alkyl ethers of N-methylol acrylamide or methacrylamide, such as the hexyl or octyl ethers.

When an N-methylol functional monomer is included within the carboxyl-functional polymer, it is desirably used in an amount of from 5% to 40% of the copolymer, preferably from 20% to 35%, and even when it is used, an external curing agent may still be used, albeit in smaller amount than if the N-methylol functional monomer were not included within the amine-functional polymer.

The aminoplast and phenoplast curing agents may be water soluble or water dispersible and are themselves well known and commonly used for the curing of reactive copolymers of the type under consideration. These are used in an amount of from 5% to 40%, preferably from 10% to 35%, based on total resin solids. Aminoplast resins are preferred, such as hexamethyoxymethyl melamine. Urea-formaldehyde condensates and benzoguanamine-formaldehyde condensates are also useful. Useful phenoplast resins are illustrated by a phenol-formaldehyde A-stage resol, and also by water insoluble heat-hardening phenolic resins which are dispersible in the copolymer dispersions under consideration.

All proportions herein and in the accompanying claims are by weight, unless otherwise specified.

EXAMPLE 1

1320 grams of 2-butoxy ethanol, 94.4 grams of 85% ortho phosphoric acid and 130 grams of additional water are heated to 95° C. in a reactor and then 2100 grams of a diglycidyl ether of bisphenol A having a number average molecular weight of 1000 (Shell Chemical Company product Epon 1001 may be used) are added slowly over 30 minutes. The temperature is then held at 95° C. for 3 hours to insure completion of all the reactions (with the phosphoric acid present and with the water). Then 480 grams of additional 2-butoxy ethanol are added to dilute the product to 55.1% solids content. The solution product has a Gardner-Holdt viscosity of Y-Z and an acid value (based on the nonvolatiles) of 41.5.

EXAMPLE 2

An acrylic copolymer solution which is useful in anodic electrocoat is provided at 60% nonvolatile solids content and containing 40.56% styrene, 44.27% n-butyl acrylate, and 14% of acrylic acid (a portion of which is post-reacted with 1.17% of propylene oxide to convert a portion of the acrylic acid to the hydroxy propyl ester. This acrylic copolymer is polymerized in conventional fashion at about 80% solids and then diluted to 60% solids by the addition of more solvent and diisopropyl amine which catalyzes the esterification reaction with the propylene oxide. The copolymer solution has a Gardner viscosity of U-X, a Gardner color of 3 and an acid value of 82. The volatile portion of the solution contains 37.1% of 2-butoxy ethanol, 2.06% diisopropyl amine and 60.83% of isopropanol.

EXAMPLE 3

A pigment paste is formed by mixing together in a sand mill 545 pounds of the acrylic copolymer solution of Example 2, 193 pounds of 2-butoxy ethanol, 74 pounds of 85% diisopropyl amine 40 pounds of fumed silica, and 744 pounds of titanium dioxide, rutile. Sand milling is continued to a Hegman grind gauge rating of 7.

EXAMPLE 4

The pigment paste produced in Example 3 is let down by mixing with 450 pounds of a partially butylated hexamethoxymethyl melamine (American Cyanamid product Cymel 1130 may be used), 100 pounds of the epoxy phosphate product of Example 1, 24 pounds of 2-butoxy ethanol, and 307 pounds of 85% diisopropyl amine. The resulting concentrate is saleable and is mixed with deionized water by the customer to provide an anodic electrocoating bath.

EXAMPLE 5

The concentrate of Example 4 is mixed with deionized water with stirring until the total solids content was in the range of 9–10% solids and the water-dispersed concentrate at 90° F. was electrodeposited upon steel panels which were immersed in the bath and electrically connected to constitute the anode of a unidirectional electrical current at 150 volts. Electrodeposition was allowed to take place until the current flow substantially ceased. At that time, the coated panels were removed from the bath, rinsed with deionized water and then baked for 20 minutes at 375° F.

The steel panels were iron phosphate-treated cold rolled steel panels (Parker Chemical Company designation EP-10).

The cured coatings were moderately glossy and exhibited excellent salt spray resistance in that there was hardly any through film corrosion and only about ⅛ inch creepage from the scribe cut in the salt spray testing which will be described in conjunction with the comparative tests which will now be discussed.

Several anodic electrocoat baths were made as here described with the exception that a bath A was made without any added epoxy phosphate, a second bath B was made with 2% of the epoxy phosphate, a third bath C was made with 4% of the epoxy phosphate, and a fourth bath D was made with 6% of the epoxy phosphate. All of these proportions are by weight based on the total weight of polymer.

These baths were electrodeposited on EP-10 panels using a bath temperature of 90° F. and a deposition voltage of 170 volts for 90 seconds. After rinsing and curing for 20 minutes at 350° F. the deposited films ranged in thickness from 0.715 mil to 0.85 mil.

The respective cured coatings were close in appearance, but when cut to base metal and subjected to continuous salt spray in a dark chamber at 95° F. for 400 hours (ASTM test B 117), the coatings lacking the epoxy phosphate rusted and the rust crept away from the cut line about ¼th inch to ⅜ inch and through film corrosion was estimated to be about 5-10%. For many utilities this is unacceptable. The coatings containing 2% epoxy phosphate showed less rusting (averaging ⅜th inch creep from the cut) and through film corrosion was reduced somewhat to an average of about 1-2%. The coatings containing 4% epoxy phosphate showed an average of only about ⅛th inch creep from the cut and through film corrosion was eliminated. This is a remarkable improvement. The corrosion results at 6% epoxy phosphate content were very favorable, but now the films exhibited significant surface wrinkling and were not satisfactory.

Similar favorable results were obtained using zinc phosphate-treated cold rolled steel panels, albeit the improvement was not as great. The iron phosphate treatment, however, is a more practical and less costly pretreatment. Also, and using oleyl alcohol epoxy ether copolymers the detergent resistance was improved and the catalytic action of the epoxy phosphate allowed a reduction in curing temperature.

What is claimed is:

1. A thermosetting aqueous anionic electrocoating composition comprising, a carboxyl-functional anionic polymer dispersed in water with the aid of water miscible organic solvent and a volatile base, and from about 1% to about 5%, based on the weight of the polymer content of the composition, of an oxirane-free epoxy phosphate, said epoxy phosphate being produced by slowly and incrementally adding a resinous polyepoxide to a solvent solution containing from 0.05 to 0.9 mole of orthophosphoric acid per oxirane equivalent in said polyepoxide together with sufficient water to hydrolyze all of the oxirane functionality which is not consumed by said orthophosphoric acid.

2. An aqueous anionic electrocoating composition as recited in claim 1 in which said epoxy phosphate is present in an amount of from 2% to 4%.

3. An aqueous anionic electrocoating composition as recited in claim 1 in which said polyepoxide is a diglycidyl ether of a bisphenol having a 1,2-epoxy equivalency in the range of 1.3-2.0 and an average molecular weight of from about 500 up to about 5000, and orthophosphoric acid is used in an amount of from 0.1 to 0.7 mole of ortho phosphoric acid per oxirane equivalent in said polyepoxide.

4. An aqueous anionic electrocoating composition as recited in claim 1 in which said polyepoxide is a diglycidyl ether of a bisphenol having a 1,2-epoxy equivalency in the range of from 1.7 to 2.0 and an average molecular weight of from about 600 up to about 3000, and orthophosphoric acid is used in an amount of from 0.2 to 0.5 mole of ortho phosphoric acid per oxirane equivalent in said polyepoxide.

5. An aqueous anionic electrocoating composition as recited in claim 1 in which said carboxyl-functional anionic polymer is a copolymer of monoethylenically unsaturated monomers comprising sufficient carboxy monomer to enable dispersion in water with the aid of a volatile base, and sufficient hydroxy monomer to enable cure with a methylol-functional curing agent.

6. An aqueous anionic electrocoating composition as recited in claim 5 in which said monomers comprise from 5% to 20% of acrylic or methacrylic acid and from 2% to 20% of hydroxy monomer.

7. An aqueous anionic electrocoating composition as recited in claim 5 in which said methylol-functional curing agent is an aminoplast resin.

8. An aqueous anionic electrocoating composition as recited in claim 7 in which said aminoplast resin is a hexamethoxymethyl melamine.

9. An aqueous anionic electrocoating composition as recited in claim 1 in which said epoxy phosphate is present in an amount of from 2% to 4%.

* * * * *